United States Patent
Lei et al.

(10) Patent No.: US 11,991,697 B2
(45) Date of Patent: May 21, 2024

(54) METHOD AND APPARATUS FOR SUBBAND BASED CHANNEL ACCESS ON UNLICENSED SPECTRUM

(71) Applicant: LENOVO (BEIJING) LIMITED, Beijing (CN)

(72) Inventors: Haipeng Lei, Beijing (CN); Zhi Yan, Beijing (CN); Lianhai Wu, Beijing (CN); Bingchao Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 550 days.

(21) Appl. No.: 17/276,132

(22) PCT Filed: Sep. 28, 2018

(86) PCT No.: PCT/CN2018/108407
§ 371 (c)(1),
(2) Date: Mar. 13, 2021

(87) PCT Pub. No.: WO2020/062056
PCT Pub. Date: Apr. 2, 2020

(65) Prior Publication Data
US 2022/0053536 A1    Feb. 17, 2022

(51) Int. Cl.
*H04L 5/00* (2006.01)
*H04L 1/16* (2023.01)
*H04L 1/1607* (2023.01)
*H04W 72/12* (2023.01)
*H04W 72/20* (2023.01)
(Continued)

(52) U.S. Cl.
CPC .......... *H04W 72/20* (2023.01); *H04L 1/1614* (2013.01); *H04L 5/0048* (2013.01); *H04W 74/0808* (2013.01)

(58) Field of Classification Search
None
See application file for complete search history.

(56) References Cited

U.S. PATENT DOCUMENTS

| 2019/0074929 A1* | 3/2019 | Aiba | H04L 1/0025 |
| 2019/0253200 A1* | 8/2019 | Salem | H04W 74/0808 |

FOREIGN PATENT DOCUMENTS

| CN | 106658742 A | 5/2017 |
| CN | 108463963 A | 8/2018 |
| EP | 3190740 A2 | 7/2017 |

OTHER PUBLICATIONS

Huawei, Hisilicon, HARQ enhancements in NR unlicensed, 3GPP TSG RAN WG1 Meeting #94, R1-1808063, Aug. 20-Aug. 24, 2018, pp. 1-8, Gothenburg, Sweden.

(Continued)

*Primary Examiner* — Hong Shao
(74) *Attorney, Agent, or Firm* — Kunzler Bean & Adamson

(57) ABSTRACT

The present application relates to method and apparatus for subband based channel access on unlicensed spectrum. One embodiment of the present disclosure provides a method comprising: receiving a downlink control information (DCI) for scheduling transmission of data on a set of bandwidth portions of a carrier, wherein the carrier comprises a plurality of bandwidth portions; performing a listen-before-talk (LBT) test on the set of bandwidth portions; and transmitting the data on one or more bandwidth portions of the set of bandwidth portions based on a result of the LBT test.

20 Claims, 5 Drawing Sheets

(51) Int. Cl.
  *H04W 74/08*    (2009.01)
  *H04W 74/0808*  (2024.01)

(56) References Cited

OTHER PUBLICATIONS

Nokia, Nokia Shanghai Bell, On support of UL transmission with configured grants in NR-U, 3GPP TSG RAN WG1 Meeting #93, R1-1806111, May 21-25, 2018, pp. 1-4, Busan, Korea.

Huawei, Hisilicon, Numerology and wideband operation in NR unlicensed, 3GPP TSG RAN WG1 Meeting #92bis, R1-1803677, Apr. 16-Apr. 20, 2018, pp. 1-8, Sanya, China.

CMCC, Discussion on DCI format design, 3GPP TSG RAN WG1 Meeting AH 1801, R1-1800546, Jan. 22-26, 2018, pp. 1-6, Vancouver, Canada.

Samsung, Signaling to support bandwidth part, 3GPP TSG-RAN NR #99bis Meeting, R2-1711188, Oct. 9-13, 2017, pp. 1-7, Prague, Czech.

Huawei, Hisilicon, Resource allocation and indication for data channel, 3GPP TSG RAN WG1 Meeting #88bis, R1-1705069, Apr. 3-7, 2017, pp. 1-8, Spokane, USA.

Ericsson, Frame structure for NR-U, 3GPP TSG-RAN WG1 Meeting #94, R1-1809201, Aug. 20-24, 2018, pp. 1-7, Gothenburg, Sweden.

Vivo, Discussion on the channel access procedures, 3GPP TSG RAN WG1 Meeting #94, R1-1808237, Aug. 20-24, 2018, pp. 1-6, Gothenburg, Sweden.

Vivo, Discussion on physical UL channel design in NR unlicensed spectrum, 3GPP TSG RAN WG1 Meeting #94, R1-1808236, Aug. 20-24, 2018, pp. 1-3, Gothenburg, Sweden.

International Searching Authority, "Notification of Transmittal of the International Search Report and the Written Opinion of the International Searching Authority, or the Declaration", PCT/CN2018/108407, dated Sep. 28, 2018, pp. 1-6.

3GPP, 3rd Generation Partnership Project; Technical Specification Group Radio Access Network; Discussion on the channel access procedures, 3GPP R1-1808237, Aug. 2018, pp. 1-6.

3GPP, 3rd Generation Partnership Project; Technical Specification Group Radio Access Network; Discussion on physical UL channel design in NR unlicensed spectrum, 3GPP R1-1808236, Aug. 2018, pp. 1-3.

\* cited by examiner

METHOD AND APPARATUS FOR SUBBAND BASED CHANNEL ACCESS ON UNLICENSED SPECTRUM

TECHNICAL FIELD

The present disclosure generally relates to a method and apparatus for communication, and especially to a method and apparatus for communication with 3GPP 5G new radio (NR) access on an unlicensed spectrum (NR-U).

BACKGROUND OF THE INVENTION

Listen Before Talk or sometimes called Listen Before Transmit (LBT) is a technique used for transmission on an unlicensed spectrum. In order to achieve fair coexistence with other wireless systems, LBT is required before a transmitter can start the transmission on an unlicensed spectrum. LBT is executed by performing energy detection on a certain channel. If the detected power of the channel is below a predefined threshold, LBT is successful, which suggests that the channel is deemed as empty and available for transmission. Only when LBT is successful, can the transmitter start the transmission on the channel and occupy the channel up to the maximum channel occupancy time (MCOT); otherwise, the transmitter cannot start the transmission and will continue to perform LBT until a successful LBT is obtained.

In 5G NR, very wide bandwidth is supported, for example, up to 100 MHz bandwidth for Frequency range 1 (FR1, 450 MHz-6000 MHz) and up to 400 MHz bandwidth for Frequency range 2 (FR2, 24250 MHz-52600 MHz). Since the unlicensed spectrum at 5.7 GHz has a wide bandwidth up to hundreds of MHz, NR-U also supports wide bandwidth.

In order to achieve fair coexistence with Wi-Fi, it is agreed that NR-U operating bandwidth is an integer multiple of 20 MHz, and LBT is performed in each portion of the operating bandwidth with a 20 MHz bandwidth.

When a Transport Block (TB) is scheduled to be transmitted on an unlicensed wide frequency, not all the portions with a 20 MHz bandwidth are available for the TB. Therefore, how to transmit the data with a number of portions of the operating bandwidth unavailable is a problem the subject disclosure aim to solve.

BRIEF SUMMARY OF THE INVENTION

One embodiment of the present disclosure provides a method comprising: receiving a downlink control information (DCI) for scheduling transmission of data on a set of bandwidth portions of a carrier, wherein the carrier comprises a plurality of bandwidth portions; performing a listen-before-talk (LBT) test on the set of bandwidth portions; and transmitting the data on one or more bandwidth portions of the set of bandwidth portions based on a result of the LBT test.

Another embodiment of the present disclosure provides a method comprising: transmitting a downlink control information (DCI) for scheduling transmission of data on a set of bandwidth portions of a carrier, wherein the carrier comprises a plurality of bandwidth portions; performing a listen-before-talk (LBT) test on the set of bandwidth portions; and receiving the data on one or more bandwidth portions of the set of bandwidth portions based on a result of the LBT test.

Yet another embodiment of the present disclosure provides an apparatus comprising: at least one non-transitory computer-readable medium having computer executable instructions stored therein; at least one receiver; at least one transmitter; and at least one processor coupled to the at least one non-transitory computer-readable medium, the at least one receiver and the at least one transmitter; wherein the computer executable instructions are programmed to implement a method comprising: receiving a downlink control information (DCI) for scheduling transmission of data on a set of bandwidth portions of a carrier, wherein the carrier comprises a plurality of bandwidth portions; performing a listen-before-talk (LBT) test on the set of bandwidth portions; and transmitting the data on one or more bandwidth portions of the set of bandwidth portions based on a result of the LBT test.

Yet another embodiment of the present disclosure provides an apparatus comprising: at least one non-transitory computer-readable medium having computer executable instructions stored therein; at least one receiver; at least one transmitter; and at least one processor coupled to the at least one non-transitory computer-readable medium, the at least one receiver and the at least one transmitter; wherein the computer executable instructions are programmed to implement a method transmitting a downlink control information (DCI) for scheduling transmission of data on a set of bandwidth portions of a carrier, wherein the carrier comprises a plurality of bandwidth portions; performing a listen-before-talk (LBT) test on the set of bandwidth portions; and receiving the data on one or more bandwidth portions of the set of bandwidth portions based on a result of the LBT test.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for subband based channel access on an unlicensed spectrum. To facilitate understanding, embodiments are provided under specific network architecture and new service scenarios, such as 3GPP 5G, 3GPP Long Term Evolution (LTE) Release 8 and so on. Persons skilled in the art know very well that, with the development of network architecture and new service scenarios, the embodiments in the present disclosure are also applicable to similar technical problems.

Figure 1:
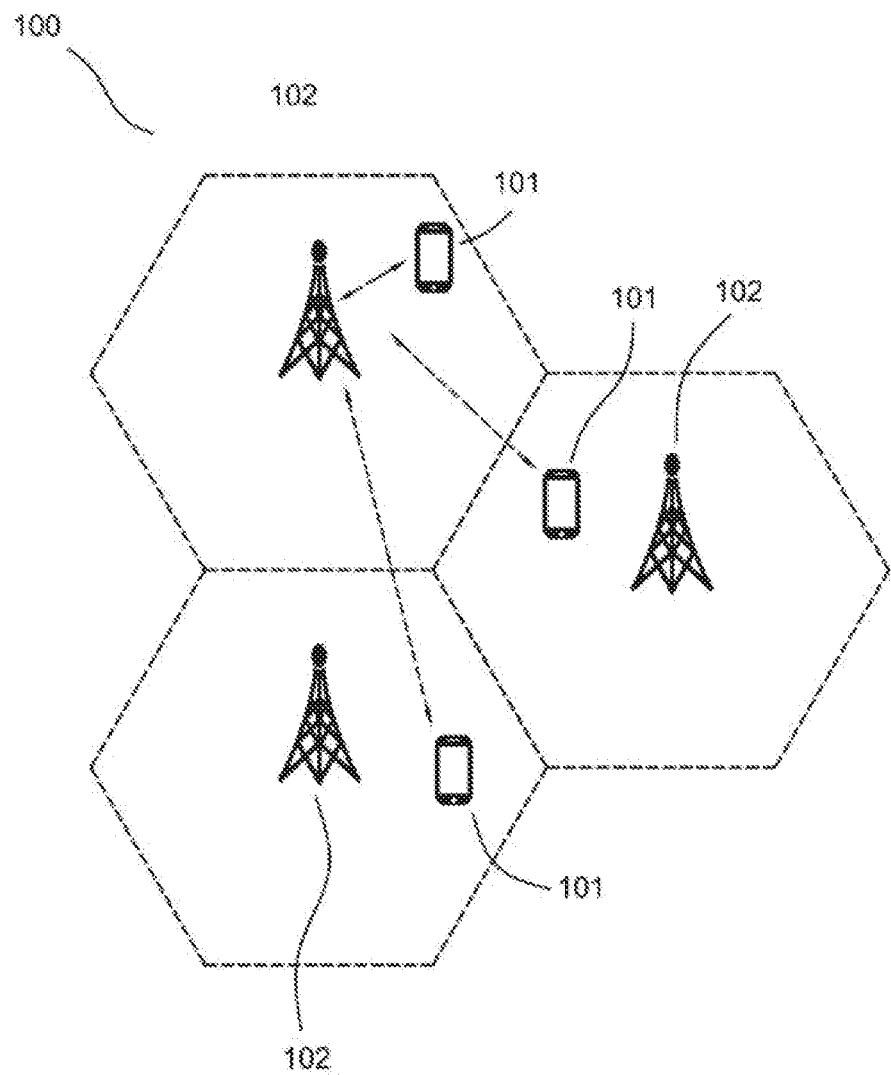
FIG. 1 illustrates a wireless communication system 100 according to an embodiment of the present disclosure.

FIG. 1 depicts a wireless communication system 100 according to an embodiment of the present disclosure.

As shown in FIG. 1, the wireless communication system 100 includes UEs 101 and BSs 102. In particular, the wireless communication system 100 includes three UEs 101 and three BSs 102 for illustrative purpose. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the DL and the UEs 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

Wireless signal transmission on an unlicensed spectrum should meet the requirements of regulation subject to the management of the located country or region. Hence, the design of uplink data for NR-U, for example, Physical Uplink Shared Channel (PUSCH) or Physical Uplink Control Channel (PUCCH), should meet the regulation requirements on unlicensed spectrum.

The requirements include:

Occupied Channel Bandwidth (OCB): the bandwidth containing 99% of the power of the signal, shall be between 80% and 100% of declared Nominal Channel Bandwidth;

Maximum Power Spectrum Density (PSD) with a resolution bandwidth of 1 MHz, e.g., 10 dBm/MHz.

These two requirements suggest that a signal which occupies a small portion of the channel bandwidth cannot be transmitted at the maximum available power at the UE due to the PSD and OCB constraints.

Figure 2:
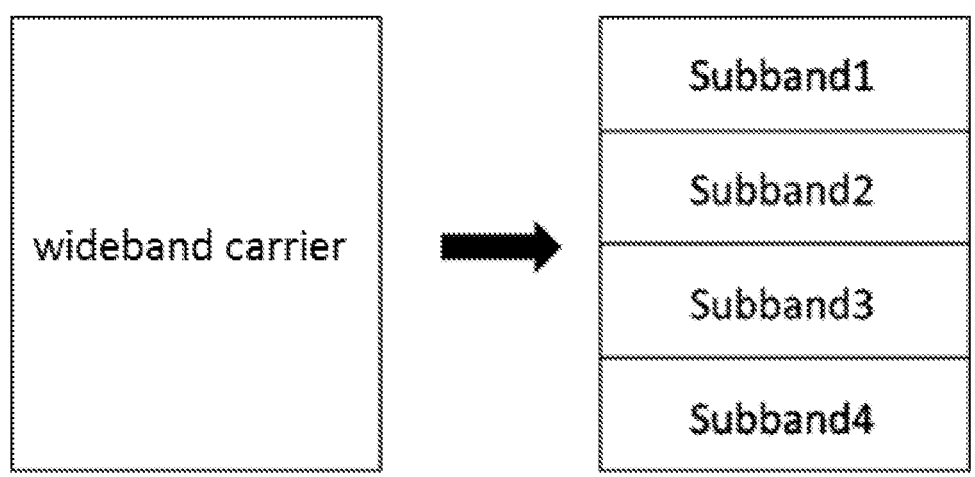
FIG. 2 illustrates a wideband carrier divided into four subbands.
Figure 3:
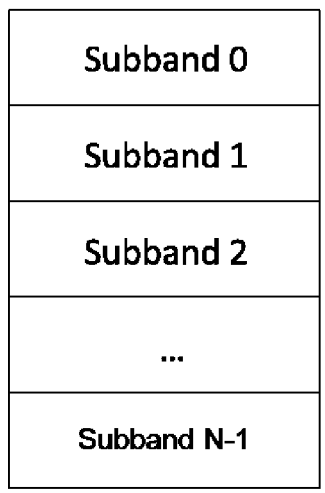
FIGS. 3(a) and 3(b) illustrate subband-based partitioning and Bandwidth Part (BWP) partitioning on a wideband carrier respectively.
Figure 3:
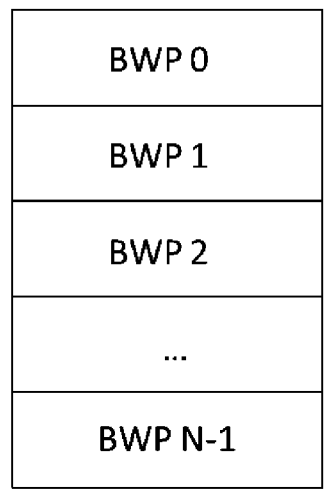

In an embodiment of the present disclosure, a wideband carrier is divided into a set of bandwidth portions. For example, FIG. 2 illustrates a wideband carrier being divided into four subbands named Subband1, Subband2, Subband3, and Subband4, respectively, for illustrative purpose only. However, the present disclosure does not intend to limit the name of a set of bandwidth portions to subband or a number of bandwidth parts. For example, FIG. 3(a) depicts that the name of the set of bandwidth portions may be Subband, and numbered from 0 to N-1, where N is an integer greater than 0. FIG. 3(b) depicts that the name of the set of bandwidth portions may be Bandwidth Part (BWP), and numbered from 0 to N-1. In this disclosure, the bandwidth portion is named as a subband. In a preferred embodiment, each subband has the same bandwidth in frequency. In another preferred embodiment, each subband has a 20 MHz bandwidth.

For the wideband carrier with integer multiple of the same subband bandwidth (e.g., 20 MHz), approaches for channel access include:

Carrier Aggregation (CA); and
Subband operation.

In the CA approach, similar to Licensed Assisted Access (LAA) or Enhanced LAA (eLAA) of LTE, a UE or a BS performs an LBT test upon each carrier based on a multi-carrier LBT operation specified in LTE LAA or eLAA, then transmit data on each available carrier.

Alternatively, in the subband operation approach, the UE or the BS performs an LBT test upon each subband and aggregates available subbands for a single PUSCH or PDSCH. For example, when some results of the LBT test with respect to some subbands indicate success while some results of the LBT test with respect to other subbands indicate failure, then the UE may transmit data on the subbands with the successful result of the LBT test, and not transmit data on the subbands with the failed result of the LBT test. As shown in FIG. 2, when results of LBT test with respect to Subband 1 and 4 are successful, it is allowed to utilize Subband 1 and 4 for data transmission simultaneously.

For the CA approach (i.e. the CA-based LBT), less standard impact is introduced when using LTE-based LAA as baseline and it also requires less stringent processing requirements because each TB is processed independently on each Component Carrier (CC). However, additional guard-band(s) are required between contiguous carriers for the CA approach.

On the other hand, the subband operation approach (i.e. the subband-based LBT) has two features: (1) there is no need to place the guard-band(s) between contiguous subbands, therefore the spectral efficiency is improved compared to the approach of CA-based LBT; and (2) dynamic spectrum usage is realized with finer granularity of LBT bandwidth.

Nevertheless, during data communication, the scheduling decision is made before performing LBT test. When a TB is determined to be transmitted on a wide frequency band, for instance, the wideband carrier of FIG. 2, subject to results of LBT test, not necessary all the subbands are available for the TB transmission at the same time. Methods for overcoming said situation may include: (1) rate matching on the available subbands; or (2) puncturing the data to be transmitted on the unavailable subbands.

With the rate matching method, high coding rate may be caused in order to transmit the scheduled TB only in the available subbands and the coding rate is variable dependent on the number of available subbands. Furthermore, UE may not have enough processing time to perform rate matching, because there is nearly no extra time from the time instant when the LBT result is considered successful to the time instant that UE starts UL transmission.

With the puncturing method, a portion of a TB that is mapped to the subband corresponding to a failed LBT result is punctured. Although it is more simple compared to the rate matching method, it may lead to failure of TB decoding gNB side when too many portions of the TB are punctured.

Some embodiments of the present disclosure provide methods to solve the aforementioned issues of the subband operation approach, and therefore improving channel utilization efficiency.

During data communication, a UE receives downlink control information (DCI) from a BS, which allocates the frequency domain resource to the UE. In one embodiment, the DCI schedules the transmission of data on a set of subbands in a wideband carrier. The wideband carrier includes a plurality of subbands, and the set of subbands may be a portion or all of the plurality of subbands. The UE then performs an LBT test on the set of subbands for uplink transmission or the BS performs an LBT test on the set of subbands for downlink transmission. According to a result of the LBT test, some subbands may be available for transmission, which means the result of the LBT test of the available subbands is successful, and the UE or the BS may transmit the data on these subbands. Correspondingly, the BS or the UE will receive the data from UE or BS transmitted on the corresponding subbands.

In a preferred embodiment, the subbands have the same bandwidth in frequency. In another preferred embodiment, the bandwidth of the subbands are all 20 MHz in frequency. In some embodiments, interlace-based structure is divided per 20 MHz subband. In detail, the carrier bandwidth is divided into multiple interlaces and each interlace includes a set of PRBs that are uniformly spaced in frequency domain. In this way, each interlace can span more than 80% of the carrier bandwidth so as to satisfy the requirement on the occupied bandwidth. Meanwhile, the minimum distance between two adjacent PRBs within each interlace is more than 1 MHz. So each PRB within one interlace can be transmitted with 10 dBm power. For example, for 15 kHz subcarrier spacing, the total number of Physical Resource Blocks (PRBs) is 106 for NR 20 MHz bandwidth, then ten interlaces are formed, wherein one interlace includes 16 PRBs and each of the other nine interlaces includes 10 PRBs or each of the ten interlaces includes 10 PRBs and the 6 remaining PRBs are left unused; or 11 interlaces are formed, wherein one interlace includes 6 PRBs and each of the other ten interlaces includes 10 PRBs.

There are two levels of frequency domain resource allocation: the first level is subband-based indication, and the second level is PRB-based indication within the assigned subbands.

For the subband-based indication, in a preferred embodiment, the DCI includes a bitmap which indicates the allocated subbands for the transmission of data. Each bit of the bitmap indicates whether a corresponding subband is assigned for the transmission of data. The assigned subbands may be distributed in the whole wideband carrier. For example, regarding a wideband with a bandwidth of 80 MHz, it is divided into 4 subbands, each subband has a bandwidth of 20 MHz. Then, 4-bit bitmap is enough to indicate whether anyone of the four subbands is allocated or not. For another example, Subband 0, Subband 2, and Subband N-1 in FIG. 3(a) may be allocated for the transmission of data. In this way, the frequency diversity gain can be further improved.

According to the DCI, there are two types of subbands in a wideband: the subbands in the wideband that allocated for data transmission, and the subbands not allocated for data transmission. In one embodiment, the size of the bitmap equals to the bandwidth of the wideband divided by the bandwidth of the subbands:

$$\text{bitmap size} = \frac{\text{the bandwidth of the wideband}}{\text{the bandwidth of the subbands}}$$

In another embodiment, the size of the bitmap equal to the active bandwidth part in the wideband divided by the bandwidth of the subbands:

$$\text{bitmap size} = \frac{\text{the bandwidth of the active bandwidth part in the wideband}}{\text{the bandwidth of the subbands}}$$

In some embodiments, the DCI may further include a bit field that indicates a starting bandwidth portion index and a number of contiguous bandwidth portions on wideband carrier. Taking FIG. 2 for example, the bit field may specify that the allocated subbands start from Subband 2, and the number of contiguous subbands is 3. Then, the UE would know the allocated subbands are Subband 2, Subband 3, and Subband 4. In this embodiment, contiguous transmission in frequency domain is realized so as to reduce the channel blocking due to power leakage on adjacent subbands.

Regrinding the PRB-based indication within the assigned subbands, current frequency domain resource assignment field is reused as interlace-based assignment within each subband. For overhead reduction, same frequency domain resource is applied for each of the assigned subbands.

As stated above, if the result of the LBT test on a particular subband is unsuccessful, the data supposed to be transmitted on the particular subband are punctured. Regarding the punctured data, subband-based retransmission is proposed according to embodiments of the present disclosure, in order to recover the punctured data.

In one embodiment, one TB is carried on one of assigned subbands. The TB is transmitted from the BS to UE when the result of the LBT test indicates success on the associated subband. When the result of the LBT test indicates failure on the associated subband, the TB is not transmitted from the BS to UE on the associated subband. In some embodiments, the TB is scheduled for retransmission on the same subband or a different subband in the next transmission opportunity. To achieve the above, the DCI may further includes a subband-based transmission indication (STI) for scheduling retransmission of the data. In a preferred embodiment, the DCI includes a bitmap with each bit of the bitmap indicating whether the data transmitted on a subband is to be retransmitted.

In some embodiments, the DCI further includes a new data indicator (NDI) with a size of one-bit. Based on the NDI and subband-based bitmap in the DCI, the UE may determine using which subband to transmit a new TB and which subband to transmit a previous TB.

In some embodiments, regarding a Hybrid Automatic Repeat Request-acknowledge (HARQ-ACK) feedback mechanism in NR, besides TB-based retransmission, Code Block Group (CBG)-based retransmission is also supported. For the TB-based retransmission, one HARQ-ACK feedback bit corresponds to one TB. As long as one Code Block (CB) of a given TB is not correctly decoded at receiver side, the entire TB is reported to a "Non-Acknowledge (NACK)". So the transmitter has to retransmit all the CBs of the TB. In the case that one HARQ-ACK feedback bit corresponds to one CB, the transmitter knows the decoding state of each transmitted CB and only retransmit the failed CBs. In this way, retransmission efficiency is high. However, the HARQ-ACK feedback overhead may be huge.

In order to balance the number of the required HARQ-ACK feedback bits and retransmission efficiency, CBG is introduced in Radio Access Network (RAN1). Basically, the intention of CBG is to group several code blocks into one code block group and the resulting HARQ-ACK feedback is generated per CBG. Only all the code blocks within one CBG are correctly decoded the HARQ-ACK for the CBG can be set to "ACK"; otherwise, it is set to "NACK". Upon the reception of the HARQ-ACK feedback, only the CBG(s) with "NACK" is retransmitted by the transmitter.

For CBG-based retransmission, Radio Resource Control (RRC) signaling is used to configure the maximum number of CBGs per TB. The maximum number of CBGs per TB can be 2, 4, 6 and 8. For both the semi-static HARQ-ACK codebook and the dynamic HARQ-ACK codebook, the number of HARQ-ACK bits for one TB is equal to the configured maximum number of CBGs per TB, regardless of the variable TBs of a given TB.

CBG-based retransmission is also suitable for unlicensed spectrums. Especially when incomplete PDSCH or PUSCH is transmitted in the initial partial slot after LBT is successful, CBG-based retransmission can be used to retransmit those CBGs punctured by the transmitter.

In a preferred embodiment, a TB is divided into a plurality of CBGs, and each subband carries an integer number of CBGs. Preferably, the numbers of CBGs carried on each subband are identical. Rate matching is adopted to align the CBG mapping in each subband. In this way, CBG transmission information (CBGTI) in DCI is used to retransmit those CBGs carried on the associated subband and punctured due to the unsuccessful result of the LBT test.

Upon reception of DCI, UE prepares the data, which may be PUSCH, according to assigned subbands in the scheduled slot. The corresponding TB indicated by DCI is divided into multiple CBGs, and the maximum number of CBGs per TB is configured by RRC signaling.

UE would calculate the number of CBGs within each subband and each subband carries the same number of CBGs.

Figure 4:
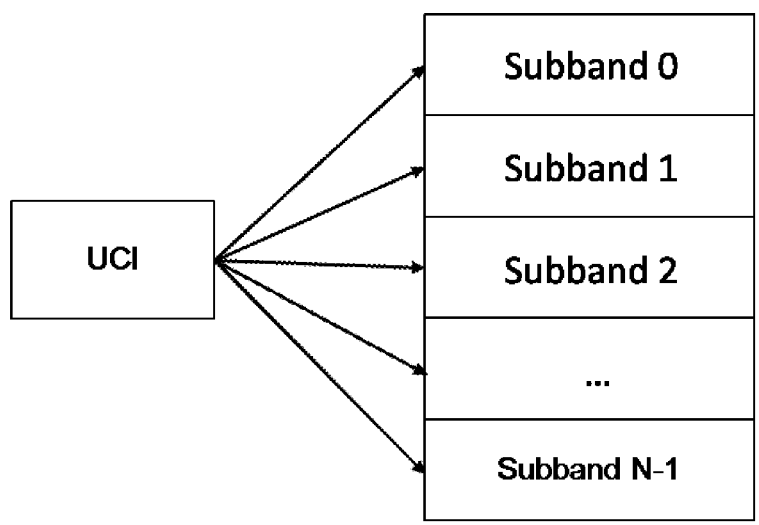
FIG. 4 illustrates UCI multiplexing on each assigned subband.

In another preferred embodiment, Uplink Control Information (UCI), for example, ACK/NACK for DL TBs, Channel State Information (CSI), etc, is transmitted along with the data in each subband. Due to the unpredictability of the result of the LBT test, the UE and BS cannot know which subband is available before LBT test, therefore, transmitting UCI in each subband would simplify the implementation complexity of the UE and BS. Preferably, the UCI is mapped as close as possible to the end of the transmission. For example, FIG. 4 illustrates that the UCI is mapped to each subband.

In one embodiment, the last several symbols carried on each subband are used for PUCCH transmission. More specifically, the number of PUCCH symbols is determined by the corresponding PUCCH format and resource.

Alternatively, the UCI may be only transmitted on one subband. For example, the index of the subband may be the lowest or smallest, or the index may be the highest, or largest, and the LBT test on the lowest or smallest, or on the highest, or largest index of subband is the first complete one. However, the BS needs to blind detect the potential occasions for UCI transmission.

In a preferred embodiment, the LBT test on the subbands includes different types of operations. For example, one type of the operation is a complete LBT Cat.4 operation with a random backoff counter selected from a variable contention window (also named type 1 UL channel access procedure in TS36.213), another type of the operation is a one-shot LBT operation with at least 25 us sensing interval (also named type 2 UL channel access procedure in TS36.213). In one embodiment, the UE selects a random subband from the allocated subbands, and performs the complete LBT Cat.4 operation on this subband. Before the LBT Cat.4 operation is completed, the UE performs the one-shot LBT operation on every other subbands of the allocated subbands.

In another embodiment, the BS dynamically indicates one subband in DCI to instruct the UE to perform a LBT Cat.4 operation on the subband, and perform a one-shot LBT operation on the other assigned subbands before the completion of the LBT Cat.4 on the indicated subband.

In another embodiment, if the UE determines that the subbands assigned for data transmission, for example, PUSCH transmission, are interleaved and non-contiguous, UE will perform independent LBT Cat.4 operation on each assigned subband. In this way, UE can transmit the data in a subband as soon as the LBT operation is completed on the subband without a defer period for other subbands.

If UE determines that contiguous subbands are assigned for PUSCH transmission, UE shall perform a LBT Cat.4 operation on one subband and a one-shot LBT operation on the other assigned subbands. In this case, defer periods are needed.

In another preferred embodiment, the transmission of data on each of a set of bandwidth portions starts from a demodulation reference signal (DMRS) symbol.

On unlicensed spectrum, for a wideband carrier with integer multiple of 20 MHz bandwidth, the wide carrier is divided into multiple BWPs with each BWP occupying 20 MHz bandwidth. The interlace-based structure is divided per BWP. Since multiple BWPs may be used for data transmission as long as the multiple BWPs have successful LBT, specification should allow in one slot when more than one BWP is activated. BWP-based bitmap is included in UL grant for indicating the assigned BWPs for PUSCH transmission.

According to the above disclosure, spectrum utilization efficiency can be further improved.

Figure 5:
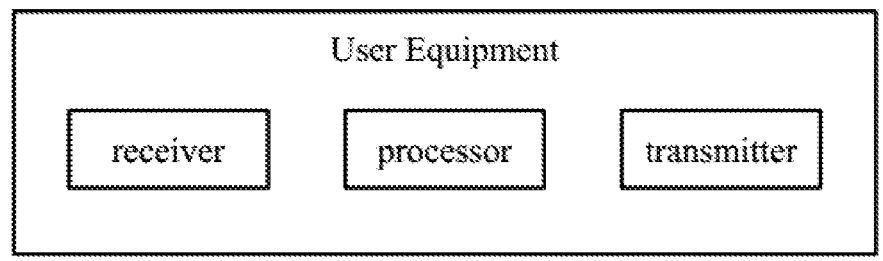
FIG. 5 illustrates an exemplary block diagram of a User Equipment (UE) according to an embodiment of the present disclosure.

FIG. 5 depicts a block diagram of a UE according to the embodiments of the present disclosure. The UE 101 may include a receiver, a processor, and a transmitter. In certain embodiments, the UE 101 may further include an input device, a display, a memory, and/or other elements. In one embodiment, the UE may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions can be programmed to implement a method with the at least one receiver, the at least one transmitter and the at least one processor. The method according to an embodiment of the present disclosure, for example, is the method shown in FIG. 4.

Figure 6:
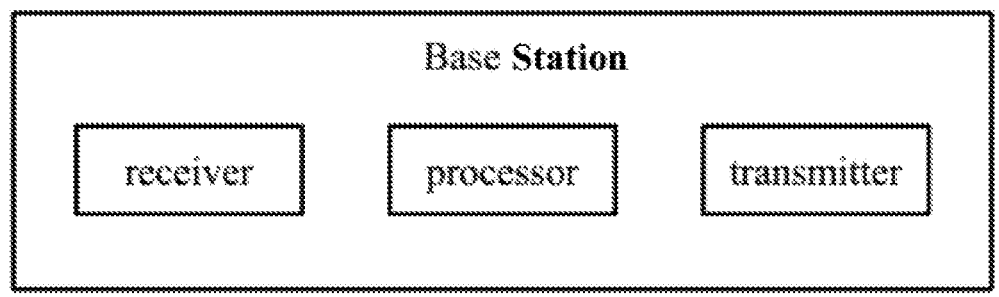
FIG. 6 illustrates an exemplary block diagram of a Base Station (BS) according to an embodiment of the present disclosure.

FIG. 6 depicts a block diagram of a BS according to the embodiments of the present disclosure. The BS 102 may include a receiver, a processor, and a transmitter. In one embodiment, the BS may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions can be programmed to implement a method with the at least one receiver, the at least one transmitter and the at least one processor. The method according to an embodiment of the present disclosure, for example, is the method shown in FIG. 4.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a user equipment (UE), the method comprising:
   receiving a downlink control information (DCI) for scheduling transmission of data on a set of bandwidth portions of a carrier, wherein the carrier comprises a plurality of bandwidth portions and each bandwidth portion has a same bandwidth in frequency;
   performing a listen-before-talk (LBT) test on the set of bandwidth portions, wherein the LBT test comprises a plurality of different types of operations, and the plurality of different types of operations comprises a complete LBT operation performed on a first bandwidth portion of the set of bandwidth portions and a one-shot LBT operation performed on a second bandwidth portion of the set of bandwidth portions; and
   transmitting the data on one or more bandwidth portions of the set of bandwidth portions based on a result of the LBT test.

2. The method of claim 1, wherein each bandwidth portion has a 20 MHz bandwidth in frequency.

3. The method of claim 1, wherein the DCI includes a bitmap with each bit of the bitmap indicating whether a corresponding bandwidth portion is assigned for the transmission of data.

4. The method of claim 1, wherein the DCI includes a bit field indicating a starting bandwidth portion index and a number of contiguous bandwidth portions on the carrier.

5. The method of claim 1, wherein the data includes a plurality of transport blocks and each of the plurality of transport blocks is to be transmitted on a corresponding bandwidth portion of the set of bandwidth portions.

6. The method of claim 1, wherein the DCI includes a bitmap with each bit of the bitmap indicating whether the data transmitted on a bandwidth portion of the set of bandwidth portions is to be retransmitted.

7. The method of claim 1, wherein the data comprise a plurality of code block groups and each bandwidth portion of the set of bandwidth portions includes an integer number of code block groups.

8. The method of claim 1, further comprising transmitting uplink control information along with the data, wherein the uplink control information is carried on each of the set of bandwidth portions.

9. The method of claim 1, further comprising transmitting uplink control information along with the data, wherein the uplink control information is carried on a particular bandwidth portion which has a lowest or smallest or highest or largest bandwidth portion index of the set of bandwidth portions; and wherein type of operation of the plurality of types of operations corresponds to the particular bandwidth portion and completes before the remaining of the plurality of types of operations.

10. The method of claim 1, further comprising transmitting uplink control information on at least one bandwidth portion of the set of bandwidth portions and the uplink control information is mapped to at least one symbol at or close to an end of the at least one bandwidth portion.

11. The method of claim 1, wherein the transmission of data on each of the set of bandwidth portions starts from a demodulation reference signal (DMRS) symbol.

12. A method performed by a base station, the method comprising:
    transmitting a downlink control information (DCI) for scheduling transmission of data on a set of bandwidth portions of a carrier, wherein the carrier comprises a plurality of bandwidth portions and each bandwidth portion has a same bandwidth in frequency;
    performing a listen-before-talk (LBT) test on the set of bandwidth portions, wherein the LBT test comprises a plurality of different types of operations, and the plurality of different types of operations comprises a complete LBT operation performed on a first bandwidth portion of the set of bandwidth portions and a one-shot LBT operation performed on a second bandwidth portion of the set of bandwidth portions; and
    receiving the data on one or more bandwidth portions of the set of bandwidth portions based on a result of the LBT test.

13. The method of claim 12, wherein each bandwidth portion has a 20 MHz bandwidth in frequency.

14. The method of claim 12, wherein the DCI information includes a bitmap with each bit of the bitmap indicating whether a corresponding bandwidth portion is assigned for the transmission of data.

15. The method of claim 12, wherein the DCI includes a bit field indicating a starting bandwidth portion index and a number of contiguous bandwidth portions on the carrier.

16. The method of claim 12, wherein the data includes a plurality of transport blocks and each of the plurality of transport blocks is to be transmitted on a corresponding bandwidth portion of the set of bandwidth portions.

17. The method of claim 12, wherein the DCI includes a bitmap with each bit of the bitmap indicating whether the data transmitted on a bandwidth portion of the set of bandwidth portions is to be retransmitted.

18. The method of claim 12, wherein the data comprise a plurality of code block groups and each bandwidth portion of the set of bandwidth portions includes an integer number of code block groups.

19. A user equipment (UE), comprising:
    at least one memory; and
    at least one processor coupled with the at least one memory and configured to cause the UE to:
        receive a downlink control information (DCI) for scheduling transmission of data on a set of bandwidth portions of a carrier, wherein the carrier comprises a plurality of bandwidth portions and each bandwidth portion has a same bandwidth in frequency;
        perform a listen-before-talk (LBT) test on the set of bandwidth portions, wherein the LBT test comprises a plurality of different types of operations, and the plurality of different types of operations comprises a complete LBT operation performed on a first bandwidth portion of the set of bandwidth portions and a one-shot LBT operation performed on a second bandwidth portion of the set of bandwidth portions; and
        transmit the data on one or more bandwidth portions of the set of bandwidth portions based on a result of the LBT test.

20. A base station, comprising:
    at least one memory; and
    at least one processor coupled with the at least one memory and configured to cause the base station to:
        transmit a downlink control information (DCI) for scheduling transmission of data on a set of bandwidth portions of a carrier, wherein the carrier comprises a plurality of bandwidth portions and each bandwidth portion has a same bandwidth in frequency;
        perform a listen-before-talk (LBT) test on the set of bandwidth portions, wherein the LBT test comprises a plurality of different types of operations, and the plurality of different types of operations comprises a complete LBT operation performed on a first bandwidth portion of the set of bandwidth portions and a one-shot LBT operation performed on a second bandwidth portion of the set of bandwidth portions; and
        receive the data on one or more bandwidth portions of the set of bandwidth portions based on a result of the LBT test.

* * * * *